(12) United States Patent  
Son et al.

(10) Patent No.: US 9,147,517 B2
(45) Date of Patent: Sep. 29, 2015

(54) MULTILAYER COIL COMPONENT

(71) Applicant: SAMSUNG ELECTRO-MECHANICS CO., LTD., Suwon-si, Gyeonggi-do (KR)

(72) Inventors: Soo Hwan Son, Suwon-si (KR); Byeong Cheol Moon, Suwon-si (KR); So Yeon Song, Suwon-si (KR); Young Il Lee, Suwon-si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/084,260

(22) Filed: Nov. 19, 2013

(65) Prior Publication Data

US 2014/0139308 A1    May 22, 2014

(30) Foreign Application Priority Data

Nov. 20, 2012    (KR) .................. 10-2012-0131550

(51) Int. Cl.
*H01F 5/00*     (2006.01)
*H01F 27/24*    (2006.01)
*H01F 27/28*    (2006.01)
*H01F 17/00*    (2006.01)
*H01B 1/02*     (2006.01)
*C04B 35/26*    (2006.01)

(52) U.S. Cl.
CPC ............ *H01F 27/2804* (2013.01); *C04B 35/26* (2013.01); *H01B 1/026* (2013.01); *H01F 17/0013* (2013.01); *C04B 2235/3239* (2013.01); *C04B 2235/3262* (2013.01); *C04B 2235/3279* (2013.01); *C04B 2235/3284* (2013.01); *C04B2235/3298* (2013.01); *C04B 2235/36* (2013.01); *H01F 2027/2809* (2013.01)

(58) Field of Classification Search
CPC ............ H01F 5/003; H01F 2027/2809; H01F 17/0006; H01F 17/0013; H01F 27/2804; H01F 27/255; H01F 27/245; H01F 3/002; H01F 3/08; H01B 1/026; C04B 35/26; C04B 2235/3298; C04B 2235/36; C04B 2235/3284; C04B 2235/3279; C04B 2235/3262; C04B 2235/3239
USPC .......................................... 336/200, 232–234
See application file for complete search history.

(56) References Cited

U.S. PATENT DOCUMENTS 6,413,651 B1 *   7/2002  Yan et al. ................... 428/592
6,489,887 B2 *  12/2002  Satoh et al. ................ 340/436
(Continued)

FOREIGN PATENT DOCUMENTS

JP          2009-206430 A      9/2009
KR        1020070088748 A      8/2007
(Continued)

OTHER PUBLICATIONS

Korean Office Action issued in Application No. 10-2012-0131550 dated Nov. 18, 2013.
Korean Notice of Allowance issued in Korean Application No. 10-2012-0131550 dated Mar. 26, 2014.

*Primary Examiner* — Mangtin Lian
(74) *Attorney, Agent, or Firm* — McDermott Will & Emery LLP

(57) ABSTRACT

Disclosed herein is a multilayer coil component, in which a copper-nickel mixture is used for an internal electrode, to form a nickel and ferrite mixed region at an interface between the internal electrode layer and a ceramic layer, thereby interrupting contact between the ceramic layer and the internal electrode, so that insulation resistance, which may be generated between the two materials can be increased and thus the deterioration in the characteristics of the multilayer coil component can be prevented.

6 Claims, 5 Drawing Sheets

(56) References Cited

U.S. PATENT DOCUMENTS

2011/0037557 A1* 2/2011 Konoue et al. ............... 336/200
2011/0285494 A1 11/2011 Jeong et al.
2012/0007709 A1* 1/2012 Taniguchi et al. ........... 336/200
2013/0027171 A1* 1/2013 Ito .............................. 336/200

FOREIGN PATENT DOCUMENTS

| KR | 102010-0101012 A | 9/2010 |
| KR | 10-2012-0115951 A | 10/2012 |
| WO | WO 2011//121828 | * 10/2011 |

* cited by examiner

MULTILAYER COIL COMPONENT

CROSS REFERENCE(S) TO RELATED APPLICATIONS

This application claims the benefit under 35 U.S.C. Section 119 of Korean Patent Application Serial No. 10-2012-0131550, entitled "Multilayer Coil Component" filed on Nov. 20, 2012, which is hereby incorporated by reference in its entirety into this application.

BACKGROUND OF THE INVENTION

1. Technical Field

The present invention relates to a multilayer coil component.

2. Description of the Related Art

As the trend toward miniaturization, high-capacity, and high-efficiency of electronic devices such as smart phones, computer tablets, and PCs is accelerating, the importance of electronic components such as inductors constituting them is growing bigger and bigger. The reason is that, as various kinds of electronic devices become smaller and have higher capacitance, electronic components are integrated in a smaller space, electromagnetic interference between electronic components becomes greater, and the number of active elements is increased due to an increase in amount of information to be treated, resulting in an increasing demand for passive elements.

The multilayer coil component including the inductor has been used in many different fields since it has no leakage magnetic flux because of an internal electrode covered with a magnetic material, and suppressed cross-talk; is suitable for high-density assembly and miniaturizable while retaining inductance (L); and maintains high reliability.

This multilayer coil component is usually manufactured by laminating and integrating magnetic sheets or sheets on which a magnetic paste and a paste for internal electrodes are printed by a printing method, a doctor blade method, or the like, and then printing a paste for external electrodes on a surface of a sintered body obtained by firing the laminate at a high temperature and firing it.

As a material for the internal electrode layer, silver (Ag) having low resistivity from the influence of direct current resistance of the multilayer coil component is mainly used. Silver (Ag), which is a noble metal, is not oxidized at a high temperature, and thus, a de-binder process (removing organic substances from a half-finished product at a high temperature) and a sintering process may be employed under a general atmosphere. However, since, in spite of these advantages, silver is a noble metal, it is expensive and temporary price variation thereof is large. Recently, inflated prices of silver impose a heavy burden on product cost, and thus a material as a replacement for silver needs to be developed.

Therefore, many studies on several metals generally useable as an internal electrode instead of silver (Ag) have been conducted. However, since most metals except for copper (Cu) have higher resistivity than silver, they are known to be inappropriate as an internal electrode for general coil elements except for as particular purposes in which low efficiency is ignored.

In order to solve these defects, the action for replacing silver (Ag) with cheap copper (Cu), as a material for the internal electrode of the multilayer coil component, has been made. However, copper has substantially not been used as the material for the internal electrode due to easy oxidation thereof in spite of excellent price competitiveness.

Therefore, in order to replace silver with copper as a material for the internal electrode of the multilayer coil component, the foregoing problems need to be urgently solved, Meanwhile, a multilayer ceramic condenser (hereinafter, referred to as MLCC) is manufactured by printing a conductive paste on molded dielectric sheets through screen, gravure, or other methods, to thereby form internal electrode layers, and then laminating the sheets having internal electrode layers printed thereon. The internal electrode layers of the MLCC have been known to be formed by using a metal powder mainly such as nickel (Ni), copper (Cu), or the like.

There are many similarities between the MLCC and the multilayer coil component in view of an external shape and a manufacturing method. However, the MLCC is a product where thin square shaped internal electrodes formed on dielectric ceramic sheets are alternately laminated to implement high capacitance, and is a parallel type condenser where the respective internal electrodes are not contacted with each other inside a chip.

Meanwhile, in the case of the multilayer coil component, coil type internal electrodes are formed on a ceramic inner layer and the coil type internal electrodes are connected with each other to implement inductance and impedance of a circuit with respect to current flowing through the coil.

In addition, the MLCC is mainly fired at a high temperature of 1000° C. or higher, and thus has a different mechanism from the multilayer coil component fired at a temperature below 1000° C.

In addition, in the case of the multilayer coil component, the resistance of the internal electrode is increase when the internal electrode is formed of copper, and thus the use of copper is restricted. However, in the case of the MLCC, there is no problem with the resistance (Rdc), and even though the internal electrode is oxidized due to the use of copper as the internal electrode, the application thereof is believed not to be too much trouble.

Therefore, even though copper and nickel are generally used as a material for an internal electrode layer of the existing MLCC, the use thereof as a material for the internal electrode of the multilayer coil component by simple replacement from this technology is still limited.

RELATED ART DOCUMENT

Patent Document (Patent Document 1) US Patent Laid-Open Publication No. 2011-0285494

SUMMARY OF THE INVENTION

An object of the present invention is to provide a multilayer coil component capable of solving problems of the related art, caused by using copper instead of silver as a material for an internal electrode of the existing multilayer coil component.

According to an exemplary embodiment of the present invention, there is provided a multilayer coil component including: a main body having a plurality of ceramic layers therein; and a plurality of internal electrodes formed on the plurality of ceramic layers, respectively, the internal electrodes being interlayer-connected to each other through via holes of the ceramic layers to form a coil pattern, wherein the internal electrodes are formed of a copper-nickel mixture, and wherein a nickel and ferrite mixed region is formed at an interface between the internal electrode and the ceramic layer.

The copper-nickel mixture may be at least one selected from the group consisting of a copper-nickel mixed powder, a copper-nickel alloy, and a copper powder coated with nickel.

Here, a nickel content in the internal electrode may be 5~25 wt %.

The nickel and ferrite mixed region may be formed by containing nickel of the internal electrode and ferrite of the ceramic layer.

The nickel and ferrite mixed region may have a thickness of 0.2~5 μm.

The ceramic layer may be formed of NiZn ferrite or MnNiZn ferrite.

The multilayer coil component may be a multilayer chip inductor, a multilayer chip bead, and a multilayer power inductor.

According to another exemplary embodiment of the present invention, there is provided a multilayer coil component including: a main body having a plurality of ceramic layers therein; and a plurality of internal electrodes formed on the plurality of ceramic layers, respectively, the internal electrodes being interlayer-connected to each other through via holes of the ceramic layers to form a coil pattern, wherein the internal electrode is formed by using a copper-nickel mixture, and wherein an area ratio of nickel to copper ($A_{Ni}/A_{Cu}$ ratio) in the internal electrode satisfies 0.03~0.2.

The copper-nickel mixture may be at least one selected from the group consisting of a copper-nickel mixed powder, a copper-nickel alloy, and a copper powder coated with nickel.

Here, a nickel content in the internal electrode may be 5~25 wt %.

The area ratio of nickel to copper ($A_{Ni}/A_{Cu}$ ratio) may be calculated by using an area of only nickel present in the internal electrode, except for nickel distributed within a thickness of 0~1.0 μm from an interface between the internal electrode and the ceramic layer.

The ceramic layer may be formed of NiZn ferrite or MnNiZn ferrite.

The multilayer coil component may be a multilayer chip inductor, a multilayer chip bead, and a multilayer power inductor.

DESCRIPTION OF THE PREFERRED EMBODIMENTS

Hereinafter, exemplary embodiments of the present invention will be described in detail with reference to the accompanying drawings.

Terms used in the present specification are for explaining the exemplary embodiments rather than limiting the present invention. As used herein, unless explicitly described to the contrary, a singular form includes a plural form in the present specification. Also, used herein, the word "comprise" and/or "comprising" will be understood to imply the inclusion of stated constituents, steps, operations and/or elements but not the exclusion of any other constituents, steps, operations and/or elements.

Figure 1:
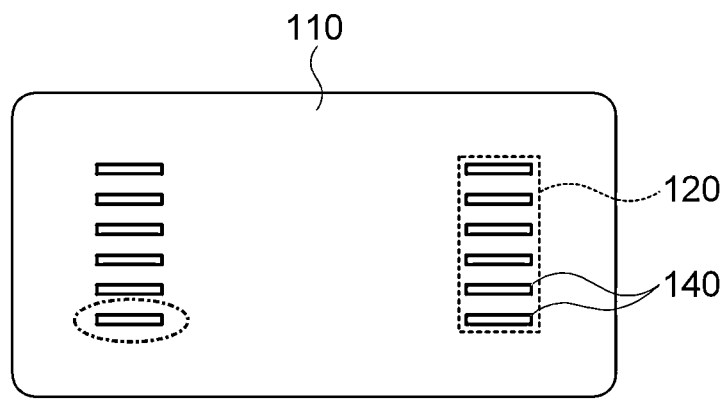
FIG. 1 shows a structure of a multilayer inductor according to an exemplary embodiment of the present invention.

A multilayer coil component according to an exemplary embodiment of the present invention, referring to FIG. 1 showing a cross section thereof, may include: a main body 110 having a plurality of ceramic layers therein; and a plurality of internal electrodes 120 formed on the plurality of ceramic layers, respectively, the internal electrodes 120 being interlayer-connected to each other through via holes of the ceramic layers to form a coil pattern, wherein the internal electrodes 120 are formed of a copper-nickel mixture, and wherein a nickel and ferrite mixed region 140 is formed at an interface between the internal electrode and the ceramic layer.

In the present exemplary embodiment, the copper-nickel mixture is used for the internal electrode 120, and some of the nickel contained in the internal electrode 120 and some of the ferrite contained in the ceramic layer 110 move out to form the nickel and ferrite mixed region 140 at the interface between the ceramic layer and the internal electrode 120.

In the case where only copper is used as a material for the internal electrode like the related art, resistance of the internal electrode may be increased due to oxidation of copper in a plasticizing process, resulting in deteriorating characteristics of the multilayer coil component. In the present invention, copper and nickel may be used by mixture to prevent the foregoing defect.

In addition, when copper and nickel are used by mixture as the material for the internal electrode, this interrupts contact between the ceramic layer and the internal electrode, and thus increases insulation resistance, which may be generated between two materials, so that the deterioration in characteristics of the multilayer coil component can be prevented.

The term "nickel and ferrite mixed region 140" means a region formed by including nickel contained in the internal electrode 120 and ferrite contained in the ceramic layer. The nickel and ferrite mixed region contains mainly nickel and partially ferrite.

Figure 2:
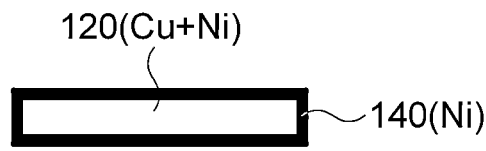
FIG. 2 shows an enlarged structure of an internal electrode in FIG. 1.

Referring FIG. 2 showing an enlarged structure of the internal electrode 120 in FIG. 1, copper and nickel are mixed and distributed in the internal electrode 120, and the nickel and ferrite mixed region 140 is formed at an outside of the internal electrode 120, and contains nickel moving out from the internal electrode 120 and ferrite moving out from the ceramic layer.

The nickel and ferrite mixed region 140 functions as a kind of insulating film, which is a barrier suppressing reaction between copper of the internal electrode 120 and ferrite of the ceramic layer, thereby increasing insulation resistance which may be generated between the two materials, and thus improving electric characteristics (impedance) to a desired level while minimizing resistance loss.

The nickel and ferrite mixed region 140 of the present invention has a thickness of 0.2~5 μm, which is particularly preferable in view of improvement in insulation resistance and electric characteristics.

The copper-nickel mixture used for the internal electrode according to the present invention may contain at least one selected from the group consisting of a copper-nickel mixed powder, a copper-nickel alloy, and a copper powder coated with nickel.

The copper-nickel mixed powder mean one in which a copper powder and a nickel powder are simply mixed. Here, the nickel content in the copper-nickel mixed powder may be preferably 5~25 wt % based on the total content of the copper-nickel mixed powder. If the nickel content in the copper-nickel mixed powder is below 5 wt %, the effect of increasing insulation resistance between copper and ferrite of the ceramic layer is insufficient. If above 25 wt %, the resistance (Rdc) is too high, resulting in deteriorating characteristics of the multilayer coil component.

In addition, the copper-nickel alloy means one in which copper and nickel are an alloy type. A method of preparing the copper-nickel alloy is not particularly limited. Copper and nickel may be alloyed by using a known method, and a commercial copper-nickel alloy may be used. The nickel content in the copper-nickel alloy may be preferably 5~25 wt %. If the nickel content in the copper-nickel alloy is below 5 wt %, the effect of increasing insulation resistance between copper and ferrite of the ceramic layer is insufficient. If above 25 wt %, the resistance (Rdc) is too high, resulting in deteriorating characteristics of the multilayer coil component.

In addition, the copper powder coated with nickel means that a surface of a copper powder is coated with nickel. A nickel layer coated on the copper powder has a thickness of preferably 0.2~1.0 μm, but is not particularly limited thereto. However, the content of nickel coated on the copper powder may be preferably 5~25 wt % based on the total content thereof. If the nickel content in the copper powder coated with nickel is below 5 wt %, the effect of increasing insulation resistance between copper and ferrite of the ceramic layer is insufficient. If above 25 wt %, the resistance (Rdc) is too high, resulting in deteriorating characteristics of the multilayer coil component.

The ceramic layer may be formed of preferably NiZn ferrite or MnNiZn ferrite, and here, may further contain glass, $Bi_2O_3$, $V_2O_5$, or the like, as a sintering aid, but is not limited thereto. In addition, in order to form the ceramic layer, known solvent and polymer binder may be further contained therein, but the kinds and contents thereof are not particularly limited, and are appropriate for forming a general ceramic layer.

In addition, the multilayer coil component includes external electrodes 130. The external electrodes 130 may be formed of the same material as the internal electrode 120 or other metals, but the material therefor is not particularly limited.

The multilayer coil component of the present invention having the foregoing structure may be applied to a multilayer chip inductor, a multilayer chip bead, a multilayer power inductor, and the like.

Figure 3:
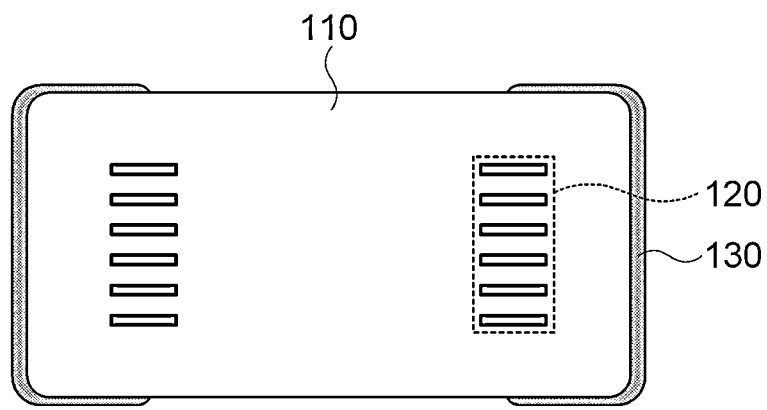
FIG. 3 shows a structure of a multilayer coil component according to the present invention.

In addition, a multilayer coil component according to another exemplary embodiment of the present invention, referring to FIG. 3 showing a cross section thereof, may include: a main body 110 having a plurality of ceramic layers therein; and a plurality of internal electrodes 120 formed on the plurality of ceramic layers, respectively, the internal electrodes 120 being interlayer-connected to each other through via holes of the ceramic layers to form a coil pattern, wherein the internal electrode 120 is formed by using a copper-nickel mixture, and wherein an area ratio of nickel to copper ($A_{Ni}/A_{Cu}$ ratio) in the internal electrode 120 satisfies 0.03~0.2.

According to the present exemplary embodiment, the copper-nickel mixture is used as a material for the internal electrode and the area ratio of nickel to copper is optimized in the internal electrode. The copper-nickel mixture may contain at least one selected from the group consisting of a copper-nickel mixed powder, a copper-nickel alloy, and a copper powder coated with nickel.

However, the nickel content in each kind of copper-nickel mixture may be preferably 5~25 wt %. If the nickel content is below 5 wt %, the effect of increasing insulation resistance between copper and ferrite of the ceramic layer is insufficient. If above 25 wt %, the resistance (Rdc) is too high, resulting in deteriorating characteristics of the multilayer coil component.

Figure 4:
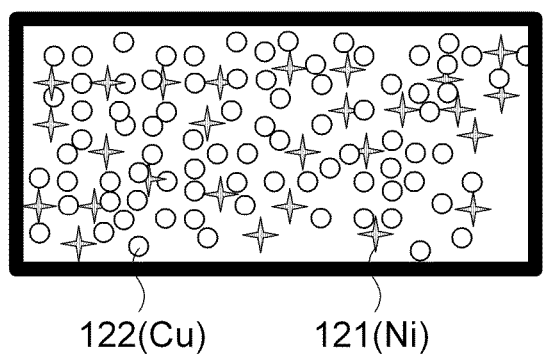
FIG. 4 shows an inner structure of an internal electrode according to an exemplary embodiment of the present invention.

In addition, the internal electrode according to the present invention is characterized in that the area ratio of nickel to copper ($A_{Ni}/A_{Cu}$ ratio) satisfies 0.03~0.2. Referring to FIG. 4 showing an enlarged structure of the internal electrode 120 according to the present invention, nickel 121 and copper 122 are mixed distributed inside the internal electrode. In the present invention, the area ratio of nickel to copper ($A_{Ni}/A_{Cu}$ ratio) in the internal electrode is preferably 0.03~0.2. If the area ratio of nickel to copper is below 0.05 in the internal electrode and thus the nickel content is too little, the effect of suppressing oxidation of copper is insufficient. If above 0.5 and thus the nickel content is too much, the resistance (Rdc) is too increased, resulting in deteriorating characteristics of the multilayer coil component.

The area ratio of nickel to copper in the internal electrode may be measured as follows. First, when the multilayer coil component of the present invention having a structure shown in FIG. 1 is measured by an optical microscope, there may be obtained a structure in black and white as shown in FIG. 5.

Figure 5:
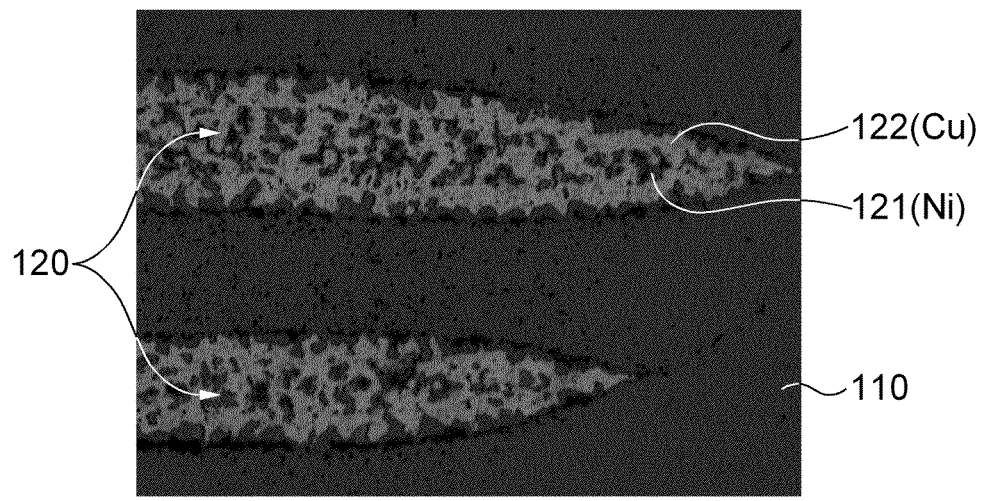
FIG. 5 is an optical microscope image of an inner structure of the multilayer coil component according to the exemplary embodiment of the present invention.

Then, referring to FIG. 5, the multilayer coil component may include: a main body 110 having a plurality of ceramic layers therein; and a plurality of internal electrodes 120 formed on the plurality of ceramic layers, respectively. It may be seen that nickel 121, black) and copper (122, white) are mixed and distributed in the internal electrode.

The area ratio of nickel to copper in the internal electrode 120 according to the present invention is calculated by using only the area of nickel present in the internal electrode 120, except for nickel distributed within a thickness of 0~1.0 μm from an interface between the internal electrode 120 and the ceramic layer.

In addition, the nickel contained in the internal electrode 120 moves out from the internal electrode 120 during a firing procedure, and ferrite moves out from the ceramic layer, to form a separate nickel and ferrite mixed region 140 at the interface between the internal electrode 120 and the ceramic layer. Therefore, the area ratio of nickel to copper in the internal electrode 120 of the present invention is calculated by using only the area of nickel present in the internal electrode 120, itself, except for the area of nickel contained in the nickel and ferrite mixed region 140.

Specifically, any region of the internal electrode except for a region corresponding to a thickness of 0~1.0 μm from the interface between the internal electrode and the ceramic layer is selected and then an optical microscope image thereof is obtained. Then, when an EPMA mapping procedure is conducted from the optical microscope image, an image where copper and nickel are indicated in different colors may be obtained. From the obtained image, the ratio of area occupied by nickel to area occupied by copper in the total area of the internal electrode may be calculated.

Meanwhile, the nickel and ferrite mixed region 140 may have a thickness of 0.2~5 μm, which is particularly preferable in view of improving insulation resistance and electric characteristics.

The ceramic layer may be formed of preferably NiZn ferrite or MnNiZn ferrite, and here, may further contain glass, $Bi_2O_3$, $V_2O_5$, or the like, as a sintering aid, but is not limited thereto. In addition, in order to form the ceramic layer, known solvent and polymer binder may be further contained therein, but the kinds and contents thereof are not particularly limited, and are appropriate for forming a general ceramic layer.

In addition, the multilayer coil component includes external electrodes 130. The external electrodes 130 may be formed of the same material as the internal electrode 120 or other metals, but the material therefor is not particularly limited.

The multilayer coil component of the present invention having the foregoing structure may be applied to a multilayer chip inductor, a multilayer chip bead, a multilayer power inductor, and the like.

Figure 6:
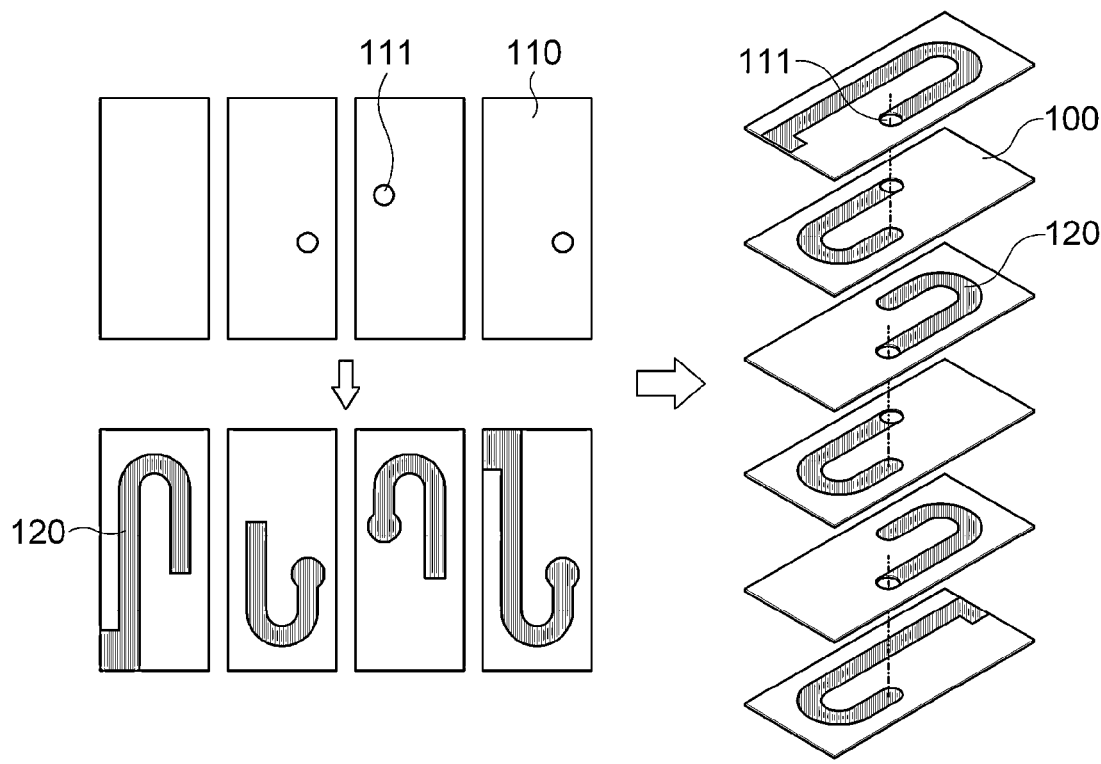
FIG. 6 shows a coil forming procedure in manufacturing the multilayer coil component according to the exemplary embodiment of the present invention.

Hereinafter, a procedure of manufacturing the multilayer coil component according to the present invention will be described with reference to FIG. 6. First, the multilayer coil component is manufactured by forming via holes 111 for interlayer interaction in ceramic layers 110 containing an organic material, which are molded through tape molding, and then printing an internal electrode paste (internal electrode 120) on the sheets, fitting to the via holes 111, to form patterns. When the thus printed patterns are laminated according to the accurate positions, the internal electrode paste is connected through via holes 111, thereby entirely forming a coil. The coil type half-finished product is cut into separate chips, and hot air is applied thereto under atmosphere to remove the organic material (de-binder). The resultant product is fired in a furnace at a high temperature of 800° C. or higher, thereby forming a chip inductor.

The ceramic layer is formed into a magnetic sheet (ferrite sheet) from a paste containing NiZn ferrite or MnNiZn ferrite. Specifically, a solvent such as ethanol or the like and a binder such as PVA or the like are added to and mixed with a ferrite fine powder after plasticizing and pulverizing, containing $Fe_2O_3$, NiO, and ZnO, as a main component, to thereby prepare a ferrite paste, and then this ferrite paste is coated on a film such as PET or the like, in a shape of a surface, by a doctor blade method or the like, thereby obtaining the magnetic sheet (ferrite sheet).

Then, a predetermined arrangement of via holes are formed in the ceramic layers by punching using molding, perforating using a laser process, or the like, and then a conductive paste for forming an internal electrode is printed on the ceramic layers to have predetermined patterns.

In addition, in the case where the multilayer coil component according to the present invention is a power inductor, a gap layer may be further formed inside the ceramic layer by using a non-magnetic material.

In the present invention, the internal electrodes are formed on the ceramic layers by using at least one selected from the group consisting of a copper-nickel mixture powder where copper and nickel are mixed with each other, a copper-nickel alloy, and a copper powder coated with nickel. It is important to contain 5~25 wt % of nickel in the copper-nickel mixture used in the internal electrode according to the present invention. In addition, a method of forming the internal electrode is not particularly limited, and may follow the known methods of the related art such as a printing method or a doctor blade method.

The respective ceramic layers having the internal electrodes thereon are laminated and integrated while the internal electrodes are connected with each other through vias to constitute a spiral shape of coil. The laminate is cut into a predetermined dimension, to obtain a chip type unfired laminate.

The unfired laminate is subjected to a plasticizing process for removing a binder component by being heated in the air at a temperature of about 150~250° C. In the present invention, since the copper-nickel mixture is used for the internal electrode, the plasticizing process on the laminate chip may be easily carried out due to the effect of suppressing oxidation of copper.

Then, the unfired laminate after removing the binder component is fired, to obtain a chip shaped laminate. Conditions for the firing process are not particularly limited. The firing process may be carried out according to the firing conditions for a general multilayer coil component, and may be preferably carried out in reduced ambience where oxygen is maintained at a low concentration.

In addition, in order to form external electrodes, a conductive paste is coated on both end portions of the chip shaped laminate by a dip coating method or the like. As the conductive paste for forming external electrodes, the same material as the internal electrode may be used or a metal paste of the related art containing silver (Ag) as a main component may be used, but the kind of material is not particularly limited.

In addition, a multilayer inductor may be manufactured by firing the laminate and then forming external electrodes at both end portions of the laminate. A plating process using nickel, tin, or the like may be applied to the external electrodes.

Hereinafter, examples of the present invention will be described in detail. The following examples merely illustrate the present invention, but the scope of the present invention should not be construed to be limited by these examples. Further, the following examples are illustrated by using specific compounds, but it is apparent to those skilled in the art that equivalents thereof are used to obtain equal or similar levels of effects.

EXAMPLES AND COMPARATIVE EXAMPLES

In the present examples, each of the multilayer inductors was manufactured through the procedure shown in FIG. 6, by using a material for an internal electrode having a nickel content shown in Table 1 below.

Experimental Example 1

Figure 7:
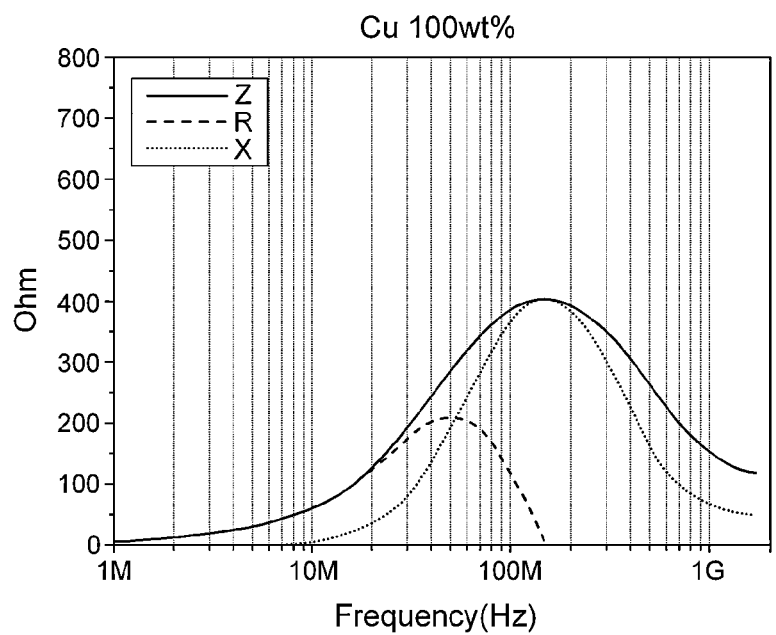
FIGS. 7 and 8 show impedance measurement results of multilayer coil components manufactured according to Example and Comparative Example, respectively.
Figure 8:
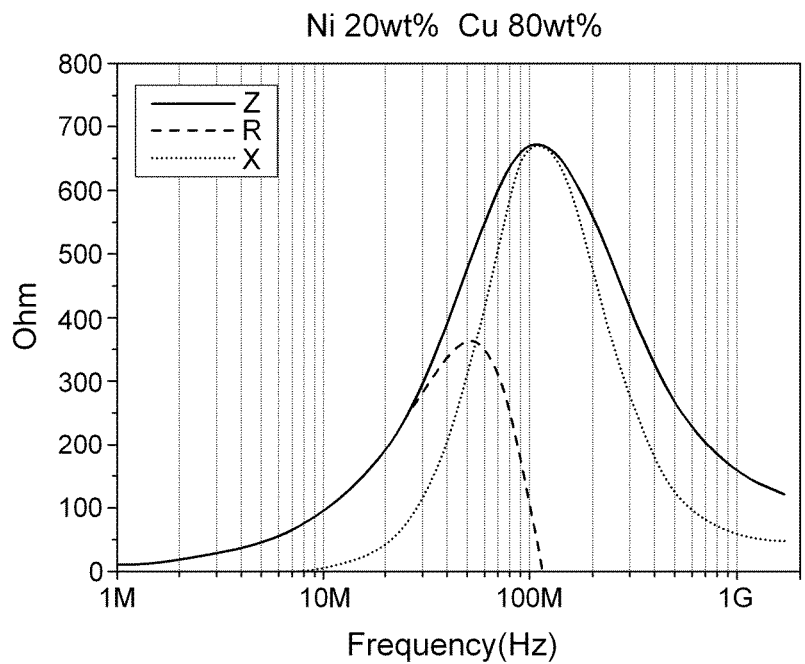

Impedance and Rdc of each of the manufactured multilayer inductors were measured, and the results were tabulated in Table 1 and FIGS. 7 and 8.

TABLE 1

| Sample No. | Ni content in Internal Electrode (wt %) | Area Ratio of Nickel to Copper in Internal Electrode | Impedance (Ohm) | Rdc (ohm) |
|---|---|---|---|---|
| 1* | 0 | 0 | 400 | 166 |
| 2* | 3 | 0.015 | 419 | 170 |
| 3 | 5 | 0.030 | 482 | 178 |
| 4 | 7 | 0.033 | 548 | 183 |
| 5 | 10 | 0.055 | 625 | 187 |
| 6 | 13 | 0.085 | 666 | 216 |
| 7 | 15 | 0.133 | 670 | 231 |
| 8 | 18 | 0.136 | 668 | 255 |
| 9 | 20 | 0.152 | 696 | 265 |

TABLE 1-continued

| Sample No. | Ni content in Internal Electrode (wt %) | Area Ratio of Nickel to Copper in Internal Electrode | Impedance (Ohm) | Rdc (ohm) |
|---|---|---|---|---|
| 10 | 23 | 0.174 | 699 | 266 |
| 11 | 25 | 0.200 | 708 | 297 |
| 12* | 27 | 0.212 | 711 | 311 |
| 13* | 30 | 0.235 | 712 | 324 |
| 14* | 35 | 0.266 | 710 | 366 |

*indicates a sample that is not included in the scope of the present invention.

Referring to Table 1 above, it may be seen that, in the case where copper and nickel are used by mixture as a material for an internal electrode of a multilayer inductor and the nickel content is in the range of 5~25 wt %, the area ratio of nickel to copper in the internal electrode satisfies 0.03~0.2.

In addition, it may be seen from the results of Table 1 that, at the time of manufacturing the multilayer inductor according to the present invention, the resistance of the multilayer inductor can be effectively controlled by adjusting the nickel content to 5~25 wt % while copper and nickel are used by mixture for the internal electrode. If the nickel content in the internal electrode is below 5 wt % (Sample Nos. 1 and 2), the increase in impedance and the decrease in resistance are insufficient. If above 25 wt % and thus a large amount of nickel is contained in the internal electrode (Sample No. 12 to 14), Rdc is increased, resulting in deteriorating characteristics of the multilayer inductor.

In addition, the impedance (Z) of the multilayer inductor using an internal electrode in which nickel is not added (100 wt % of copper is only used) was measured to a level of 400 ohm (@100 MHz, Agilent 4291B, Fixture 16193A), as shown in FIG. 7.

However, the impedance (Z) of the multilayer inductor using an internal electrode in which 20 wt % of nickel is contained was measured to about 696 ohm, as shown in FIG. 8.

In addition, it may be seen that frequencies at which maximum points of impedance and R-X cross points are shown are similar in FIGS. 7 and 8. Impedance $|Z|=R+jX$, and when bead products are identical in view of design (size, area, and winding number of a coil), and material permeability, R-X cross points thereof are also identical. In the same design, increased permeability moves the R-X cross point to lower frequency, and decreased permeability moves the R-X cross point to higher frequency. Therefore, from the above results, it may be determined that permeability of the ferrite materials are the same and it may be seen that the impedance (Z) characteristics are largely varied depending on whether or not the internal electrode contains nickel.

Experimental Example 2

Figure 9:
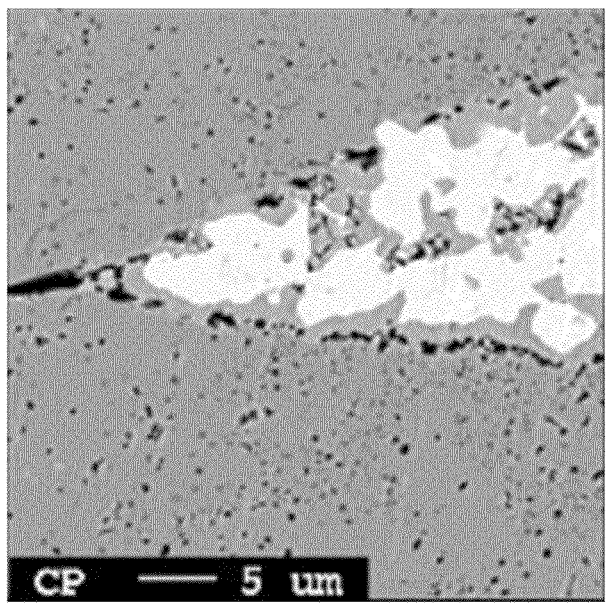
FIG. 9 is a scanning electron microscope image of a part of the optical microscope image of FIG. 5.

A structure of the multilayer inductor manufactured according to the exemplary embodiment of the present invention was confirmed by an optical microscope (FIG. 5) and a part of FIG. 5 was observed by a scanning electron microscope and the results were shown in FIG. 9. In addition, through EPMA mapping of FIG. 9, morphology of copper was shown in FIG. 10A and morphology of nickel was shown in FIG. 10B. From the results, the area ratio of nickel to copper in the internal electrode was calculated, which was then shown in Table 1 above.

Next, referring to FIG. 5, the multilayer inductor according to the present invention includes ceramic layers and internal electrodes printed on the ceramic layers, and it may be confirmed that copper (white) and nickel (black) were mixed and distributed in the internal electrode; and a black band shape and a nickel and ferrite mixed region (3~5 μm) were formed at the interface between the internal electrode and the ceramic layer.

In addition, it may be seen that, also in the image of FIG. 9, which was obtained by observing a part of FIG. 5 through a scanning electron microscope, nickel (black) and copper (white) were mixed and distributed in the internal electrode and a black band shape and a nickel and ferrite mixed region were formed at the interface between the internal electrode and the ceramic layer.

Figure 10A:
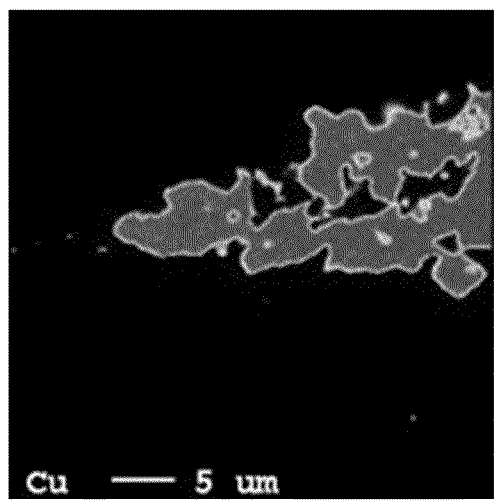
FIGS. 10A and 10B are images showing distributions of copper (a) and nickel (b) in an internal electrode, which are measured by EPDA mapping of FIG. 9.
Figure 10B:
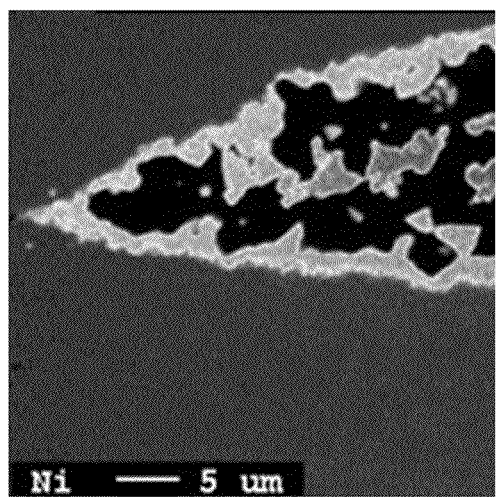

It may be seen that, when the scanning electron microscope image was subjected to EPMA mapping, a part occupied by copper was displayed in FIG. 10A, and a part occupied by nickel was displayed in white color in FIG. 10B. Therefore, the area ratio of nickel to copper in the internal electrode may be calculated from the images of copper and nickel. The area ratio data of Table 1 above were calculated in this manner.

According to exemplary embodiments of the present invention, the copper-nickel mixture is used as a material for the internal electrode of the multilayer coil component to form the nickel and ferrite mixed region at the interface between the internal electrode and the ceramic layer, thereby interrupting contact between the ceramic layer and the internal electrode, so that insulation resistance, which may be generated between the two materials can be increased and thus the deterioration in the characteristics of the multilayer coil component can be prevented.

Further, according to the exemplary embodiments of the present invention, while the copper-nickel mixture is used as a material for the internal electrode of the multilayer coil component, the nickel content in the internal electrode is adjusted to thereby optimize the area ratio of nickel to copper, thereby preventing deterioration in characteristics of the multilayer coil component, so that ferrite characteristics of the multilayer coil component, such as, impedance (Z), inductance (L), and the like, can be improved.

Further, the internal electrode according to the present invention, formed of the copper-nickel mixture can be used in a general multilayer chip bead, a multilayer chip inductor, a multilayer power inductor, and the like.

What is claimed is:

1. A multilayer coil component comprising:
   a main body having a plurality of ceramic layers therein; and a plurality of internal electrodes formed on the plurality of ceramic layers, respectively, the internal electrodes being interlayer-connected to each other through via holes of the ceramic layers to form a coil pattern,
   wherein the internal electrodes comprise a copper-nickel mixture, and wherein an area ratio of nickel to copper ($A_{Ni}/A_{Cu}$ ratio) in the internal electrodes satisfies 0.03-0.2, and wherein the area ratio of nickel to copper ($A_{Ni}/A_{Cu}$ ratio) is calculated by using an area of only nickel present in the internal electrode, except for nickel distributed within a thickness of 0-1.0 μm from an interface between the internal electrode and the ceramic layer.

2. The multilayer coil component according to claim 1, wherein the copper-nickel mixture is at least one selected from the group consisting of a copper-nickel mixed powder, a copper-nickel alloy, and a copper powder coated with nickel.

3. The multilayer coil component according to claim 1, wherein a nickel content in the internal electrodes is 5-25 wt %.

4. The multilayer coil component according to claim 1, wherein the ceramic layer is formed of NiZn ferrite or MnNiZn ferrite.

5. The multilayer coil component according to claim 1, wherein the multilayer coil component is a multilayer chip inductor, a multilayer chip bead, and a multilayer power inductor.

6. The multilayer coil component according to claim 5, wherein the impedance of the multilayer chip inductor ranges from 482 ohm to 708 ohm.

\* \* \* \* \*